United States Patent
Uchiyama

(10) Patent No.: US 6,975,576 B1
(45) Date of Patent: Dec. 13, 2005

(54) OPTICAL HEAD DEVICE AND DISK DRIVE SYSTEM HAVING FIRST AND SECOND LIGHT SOURCES FOR EMITTING LIGHT BEAMS OF DIFFERENT WAVELENGTHS

(75) Inventor: Mineharu Uchiyama, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 712 days.

(21) Appl. No.: 09/616,364

(22) Filed: Jul. 13, 2000

(30) Foreign Application Priority Data

| Jul. 13, 1999 | (JP) | ................................. 11-199464 |
| Jul. 7, 2000 | (JP) | ............................. 2000-206937 |

(51) Int. Cl.⁷ ............................................... G11B 7/08
(52) U.S. Cl. ............................................... 369/112.15
(58) Field of Search ...................... 369/112.15, 112.03, 369/112.05

(56) References Cited

U.S. PATENT DOCUMENTS

| 5,243,585 | A | * | 9/1993 | Hoshino et al. | ......... 369/44.41 |
| 5,361,244 | A | * | 11/1994 | Nakamura et al. | ....... 269/44.23 |
| 5,513,164 | A | * | 4/1996 | Tanaka et al. | ............. 369/53.2 |
| 5,541,909 | A | * | 7/1996 | Nakajima et al. | ........ 369/275.1 |
| 5,570,333 | A | * | 10/1996 | Katayama | .............. 369/110.03 |
| 5,684,762 | A | * | 11/1997 | Kubo | ...................... 369/13.28 |
| 5,687,153 | A | * | 11/1997 | Komma et al. | ........ 369/112.12 |
| 5,717,674 | A | * | 2/1998 | Mori et al. | ............... 369/112.1 |
| 5,757,754 | A | * | 5/1998 | Yamamoto et al. | .... 369/112.12 |
| 5,825,022 | A | * | 10/1998 | Takekoshi et al. | .......... 250/225 |
| 5,923,796 | A | * | 7/1999 | Feldman et al. | .............. 385/14 |
| 5,986,996 | A | * | 11/1999 | Kitamura et al. | ...... 369/112.16 |
| 6,072,579 | A | * | 6/2000 | Funato | ....................... 356/457 |
| 6,084,843 | A | * | 7/2000 | Abe et al. | .............. 369/112.07 |
| 6,094,308 | A | * | 7/2000 | Katsuma | ..................... 359/569 |
| 6,115,345 | A | * | 9/2000 | Kato et al. | ............... 369/112.1 |
| 6,130,872 | A | * | 10/2000 | Sugiura et al. | ........ 369/112.04 |
| 6,181,668 | B1 | * | 1/2001 | Kajiyama et al. | ...... 369/112.02 |
| 6,211,511 | B1 | * | 4/2001 | Shih et al. | .............. 250/214 R |
| 6,240,053 | B1 | * | 5/2001 | Akiyama | ................. 369/44.23 |
| 6,301,216 | B1 | * | 10/2001 | Takahashi | .............. 369/112.28 |
| 6,358,764 | B1 | * | 3/2002 | Nemoto | ....................... 438/22 |
| 6,363,038 | B1 | * | 3/2002 | Yanagawa | ................. 369/44.32 |

(Continued)

FOREIGN PATENT DOCUMENTS

JP        62-219341         9/1987

(Continued)

OTHER PUBLICATIONS

Translation of JP 11-185282.*

(Continued)

*Primary Examiner*—Brian E. Miller
*Assistant Examiner*—Michael V. Battaglia
(74) *Attorney, Agent, or Firm*—Pillsbury Winthrop Shaw Pittman, LLP

(57) ABSTRACT

When a light source of a first wavelength is used, side beams are allowed to occur, whereas side beams are prevented from occurring when a light source of a second wavelength is used, thereby raising the light use efficiency of the second light source. A semiconductor laser device comprises a first light source for emitting a light beam of a first wavelength and a second light source for emitting a light beam of a second wavelength different from the first wavelength. The grading groove of a diffraction grating is so formed that the first-order diffraction efficiency is almost zero for the light beam from the first light source and the first-order diffraction light is emitted for the light beam from the second light source.

9 Claims, 10 Drawing Sheets

U.S. PATENT DOCUMENTS

| | | | | |
|---|---|---|---|---|
| 6,366,548 B1 * | 4/2002 | Ohyama | ............... | 369/112.04 |
| 6,385,158 B1 * | 5/2002 | Takagi et al. | .......... | 369/112.16 |
| 6,404,709 B1 * | 6/2002 | Kouno | ................... | 369/44.23 |
| 6,414,930 B1 * | 7/2002 | Shiono et al. | ......... | 369/112.03 |
| 6,507,009 B1 * | 1/2003 | Ohnishi et al. | .......... | 250/201.2 |
| 6,584,060 B1 * | 6/2003 | Oohchida et al. | ...... | 369/112.05 |

FOREIGN PATENT DOCUMENTS

| | | |
|---|---|---|
| JP | 4-93922 | 8/1992 |
| JP | 4-212730 | 8/1992 |
| JP | 9-128794 | 5/1997 |
| JP | 10-289468 | 10/1998 |
| JP | 11-39705 | 2/1999 |
| JP | 11-185282 | 7/1999 |
| JP | 2001-243651 | 9/2001 |

OTHER PUBLICATIONS

Office Action, dated Apr. 20, 2004 from the Japanese Patent Office for Patent Application No. 11-199464.

Technical Digest of the seventh Microoptics Conference, "Development of DVD Optical Pickup using TWIN-LD" M.Uchiyama et al, pp. 18-21, Jul. 14, 1999.

Technical Digest of the Seventh Microoptics Conference, "Development of 7.3mm Height DVD Optical Pickup Using TWIN-LD" T. Ebihara et al, pp. 6-9, Jul. 14, 1999.

* cited by examiner

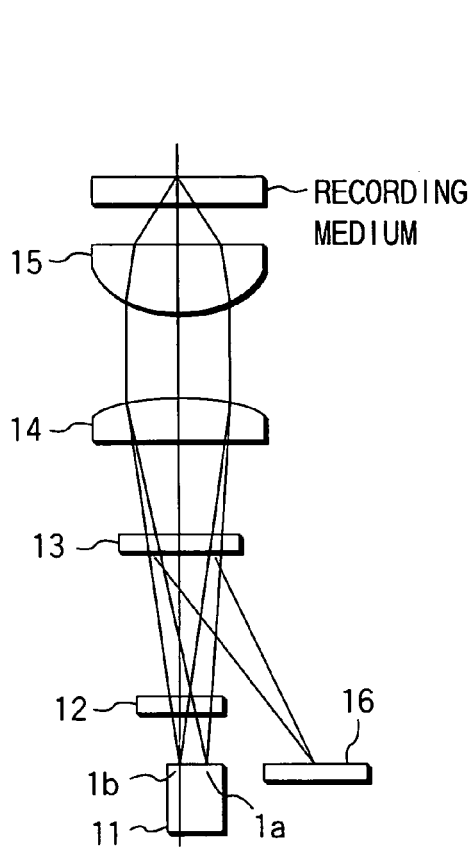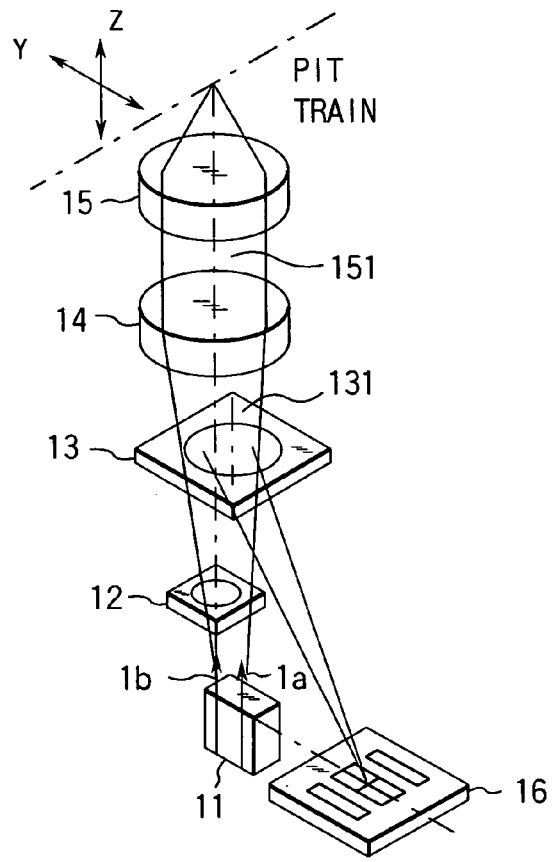
FIG. 9A
FIG. 10A
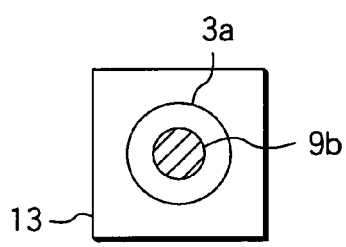
FIG. 9B
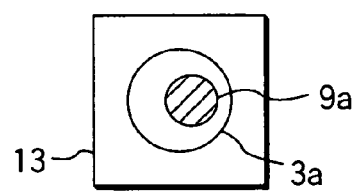
FIG. 9C
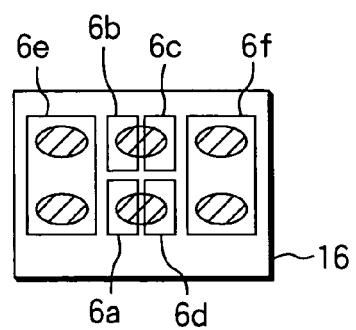
FIG. 10B

OPTICAL HEAD DEVICE AND DISK DRIVE SYSTEM HAVING FIRST AND SECOND LIGHT SOURCES FOR EMITTING LIGHT BEAMS OF DIFFERENT WAVELENGTHS

CROSS-REFERENCE TO RELATED APPLICATIONS

This application is based upon and claims the benefit of priority from the prior Japanese Patent Applications No. 11-199464, filed Jul. 13, 1999; and No. 2000-206937, filed Jul. 7, 2000, the entire contents of which are incorporated herein by reference.

BACKGROUND OF THE INVENTION

This invention relates to an optical head device effective in reading or recording the signal from or onto various types of optical recording mediums (including a digital video disk (DVD) and a compact disk (CD)).

In the field of recording mediums, DVD has recently been developed which enables high-density recording, although having the same diameter (12 cm) as that of a conventional CD on which audio or digital data is recorded. Since having the high recording density, DVD requires a beam of light of a shorter wavelength (650 nm) than the wavelength (780 nm) of a beam of light used to read the data on the CD.

It is desirable that a reproducing apparatus should be capable of playing back a disk system of both the CD type and the DVD type. Thus, a disk system with a CD light source (with a wavelength of 780 nm) and a DVD light source (with a wavelength of 650 nm) has been developed as an optical head device (or an optical pickup) using a multi-wavelength semiconductor array.

The optical head device includes a first light source and a second light source and further a diffraction grating to which the light from either of the first or second light source is directed. The diffraction grating particularly separates a CD light beam into three beams. The beams of light emitted from the diffraction grating pass through a hologram and then through a collimator lens and turn into collimated light. The collimated light enters an objective lens. The light gathered by the objective lens is projected onto the recording surface of a disk. The light reflected from the disk passes through the objective lens and the collimator lens and enters the hologram. The hologram diffracts the reflected light and directs it to a photodetector composed of photodiodes. The photodetector outputs a focus error signal, a tracking error signal, and a read signal.

(A1) In the optical head device, when the device is set in the CD reading state, the laser beam with a wavelength of 780 nm from the light source is inputted to the diffraction grating, which then outputs three beams. One of the three beams is the main beam and the remaining two are sub-beams. The intensity ratio of the main beam to the sub-beam is about 8:1.

When the device is set in the DVD reading state, the laser beam with a wavelength of 650 nm from the light source also passes through the diffraction grating. This permits unnecessary side beams to occur. As a result, the efficiency of the main beam decreases. Naturally, in the photodetector receiving the reflected light from the disk, the light-receiving efficiency of the main beam decreases. This causes the problem of degrading the C/N of the signal. To improve the C/N of the signal, the amount of emission of a DVD light source may be increased. With this approach, however, there is a strong possibility that the device will be used beyond the maximum rating of the semiconductor laser, impairing the reliability of the device.

(B1) A conventional equivalent has disadvantages in that its overall mechanism is complex and its structure is great.

(C1) In the optical head device that reads both of CD and DVD signals, birefringence components might take place in the reflected light from a CD. In that case, the amount of light received by the photodetector fluctuates. The large amount of birefringence components causes a problem: the playback signal deteriorates seriously.

(D1) In the optical head device, when a first light source for DVD and a second light source for CD are used, the quality of the playback signal tends to deteriorate.

(E1) In addition, there is another problem: the level of the focus error signal in DVD playback drops.

(F1) There is still another problem: the quality of the focus error signal deteriorates.

(G1) To play back either a CD or DVD, a good playback performance is needed. To satisfy this requirement, a method of aligning the position of each component part must be improved.

BRIEF SUMMARY OF THE INVENTION (A2) Regarding the problem in (A1), an object of the present invention is to provide an optical head device which produces side beams when using a light source of a second wavelength but does not produce any side beam when using a light source of a first wavelength, thereby increasing the light use efficiency of the first light source.

(B2) Regarding the problem in (B1), an object of the present invention is to provide an optical head device capable of producing a side beam unique to each laser beam without increasing the overall structure of the device, even when using a laser light-emitting element having light sources in very close positions in such a manner that they correspond to disks.

(C2) Regarding the problem in (C1), an object of the present invention is to provide an optical head device which has an optical layout providing a good playback performance for both DVD and CD.

(D2) Regarding the problem in (D1), an object of the present invention is to provide an optical head device which has not only a small difference between the best tilt angles of the respective beams for DVD and CD in the optical head using a semiconductor laser array but also a good playback performance.

(E2) Regarding the problem in (E1), an object of the present invention is to provide an optical head device which generates a good-quality focus error signal in playing back both of DVD and CD.

(F2) Regarding the problem in (F1), an object of the present invention is to provide an optical head device which has the optimum distance between the semiconductor laser array and the hologram.

(G2) Furthermore, an object of the present invention is to provide a method of installing a hologram in an optical head device in such a manner that the accuracy of installing a semiconductor laser is alleviated and, even in the alleviated state, the effect of impairing the playback performance is reduced.

(A3) The object in item (A2) is accomplished by providing an optical head device comprising a first light source for emitting a light beam of a first wavelength, a second light source which is placed at almost the same position as that of the first light source and emits a light beam of a second wavelength differing from the first wavelength, and a diffraction grating which has a first-order diffraction efficiency of almost zero for the light beam from the first light source and emits the first-order diffraction light for the light beam from the second light source; with this configuration, the light use efficiency of the second light source is increased.

(B3) The object in item (B2) is accomplished by providing an optical head device comprising light-emitting means for emitting laser beams from adjacent positions, a light-receiving element for receiving the reflected light from an optical disk, a hologram for diffracting the reflected light from the optical disk toward the light-receiving element, and a diffraction grating which is placed between the hologram and the light-emitting means in such a manner that the laser beams strike at separate positions and which diffracts the laser beam emitted from at least one of the light sources. With this configuration, an optical integrated element applicable to more than one disk system is obtained without making the overall structure of the optical system larger.

(C3) To achieve the object in item (C2), a nonpolarization blaze hologram is used as an element for directing the reflected light to the photodetector.

With this approach, the light use efficiency is 1.5 time as high as that of a usual hologram, when a nonpolarization rectangular hologram is used, which improves the DVD playback performance. Use of a nonpolarization hologram prevents the amount of light received from fluctuating due to birefringence, which provides a stable playback signal.

(D3) To achieve the object in item (D2), the optical axis of the second light source for CD is aligned close with the optical axis of the objective. This permits oblique incidence to occur on the objective lens in DVD, but prevents oblique incidence from occurring in CD. Since in a DVD/CD interchangeable objective lens, the aberration caused by oblique incidence in DVD is astigmatism, the deterioration of the best tilt angle and the performance of the playback signal becomes less, which makes the difference between the best tilt angle in DVD and that in CD small and provides a good playback performance of playback signal.

(E3) To accomplish the object in item (E2), the center of the hologram is placed at the midpoint between the optical axis of the first light source and that of the second light source. This makes both the amplitude of the focus error signal in CD playback and that in DVD playback suitable, which improves the quality of the focus error signal in the entire device.

(F3) To achieve the object in item (F2), the distance between the first and second light sources and the hologram is set in the range from 20 δ to 40 δ, where δ is the distance between the first light source and the second light source.

(G3) To attain the object in item (G2), markers are provided on the hologram at the CD light source position and the projected position in the direction of the optical axis of the photodetector. When a hologram, a CD light source, and a photodetector are assembled using such markers, because the light-receiving spot on the photodetector is greater in DVD playback than that in CD playback, the DVD playback performance will not be degraded seriously, even if, for example, the semiconductor laser is installed in such a manner that it is turned slightly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9A shows still another embodiment of the present invention;

FIGS. 9B and 9C are explanatory diagrams of beam spots projected on the hologram;

FIG. 10A is an explanatory diagram of a device where the center of the hologram is shifted from the optical axis of the objective, showing still another embodiment of the present invention;

FIG. 10B shows the relationship between the photodetector and the beam spots of the reflected light;

DETAILED DESCRIPTION OF THE INVENTION

Hereinafter, referring to the accompanying drawings, embodiments of the present invention will be explained.

Figure 1:
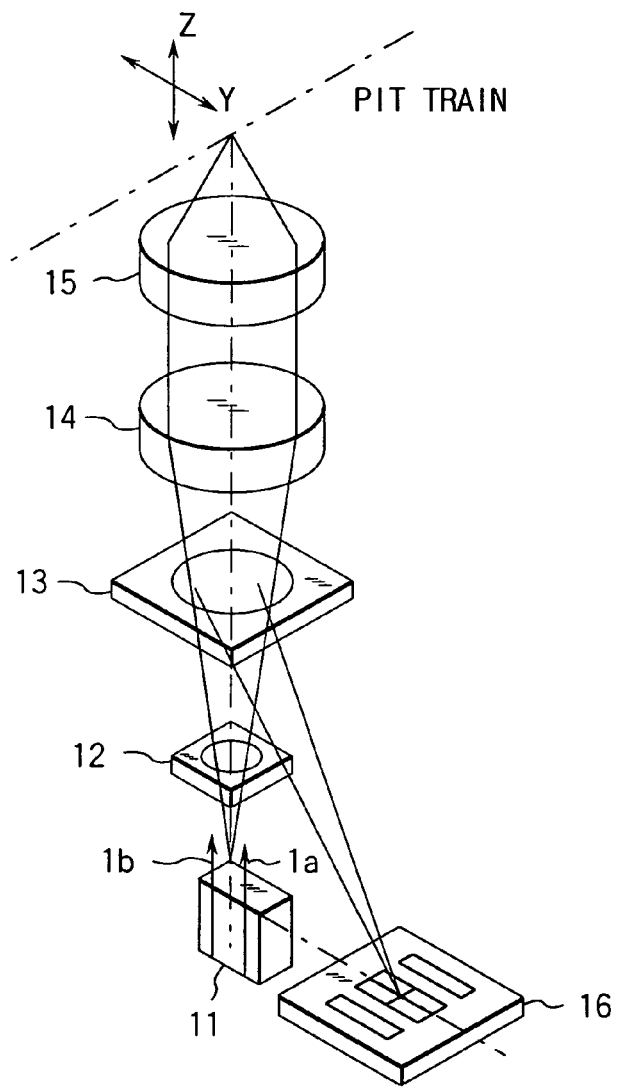
FIG. 1 shows the configuration of an optical head device according to an embodiment of the present invention.

FIG. 1 shows an embodiment of the present invention. A semiconductor laser device 11, which is what is called a chip laser (a single block), has a CD light source 1b (for outputting a beam of light with a wavelength of 780 nm) and a DVD light source 1a (for outputting a beam of light with a wavelength of 650 nm) in such a manner that they are close to each other. The light emitted from the so-called multi-wavelength semiconductor laser device 11 passes through a diffraction grating 12 and a hologram 13 and enters a collimator lens 14. The light emitted from the collimator lens 14 turns into collimated light, parallel light, and enters an objective lens 15. The light going from the light source to a recording medium is referred to as transmit light. The light converged at the objective lens 15 is projected onto pit trains (information recording tracks) in a recording medium.

The light reflected from the recording medium passes through the objective lens 15 and collimator lens 14 and enters the hologram 13. The hologram 13 refracts the reflected light and directs it to a photodetector 16.

Figure 2B:
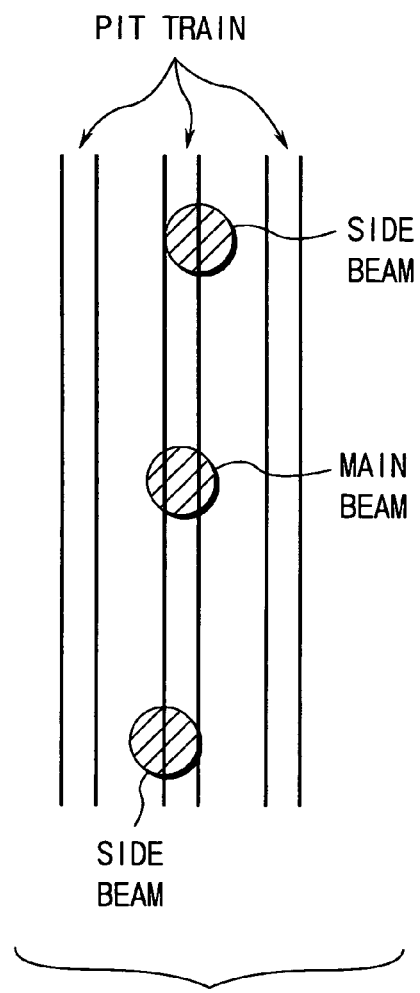
FIG. 2B is a diagram to help explain beam spots in reading the recorded data on a disk by a three beam method.
Figure 2A:
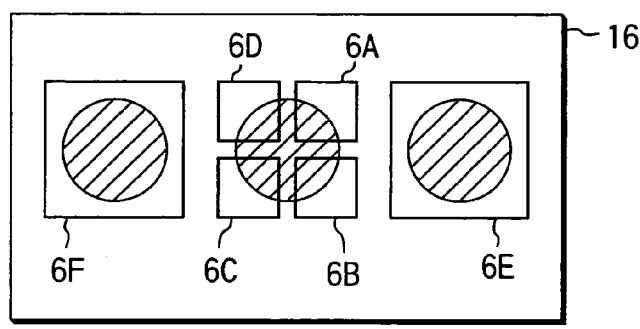
FIG. 2A shows the configuration of the photodetector in FIG. 1.

The photodetector 16 is composed of, for example, quadrisected photodiodes 6A, 6B, 6C, and 6D for main beam (a single beam) and photodiodes 6E and 6F for side (sub) beams provided on both sides of the photodiodes 6A, 6B, 6C, and 6D as shown in FIG. 2A.

FIG. 2B shows the relationship between pit trains (tracks) in a CD and three beams. Ideally, the main beam follows the center line of a read pit train (track) and the front and back sub-beams track the right and left ends of the pit train. Therefore, when the difference between the photoelectric conversion outputs from the photodiodes 6E and 6F of the photodetector 16 is obtained, the difference component can be used as a tracking error signal.

The present invention is characterized by having the following characteristic of the diffraction grating 12 described below.

Figure 3A:
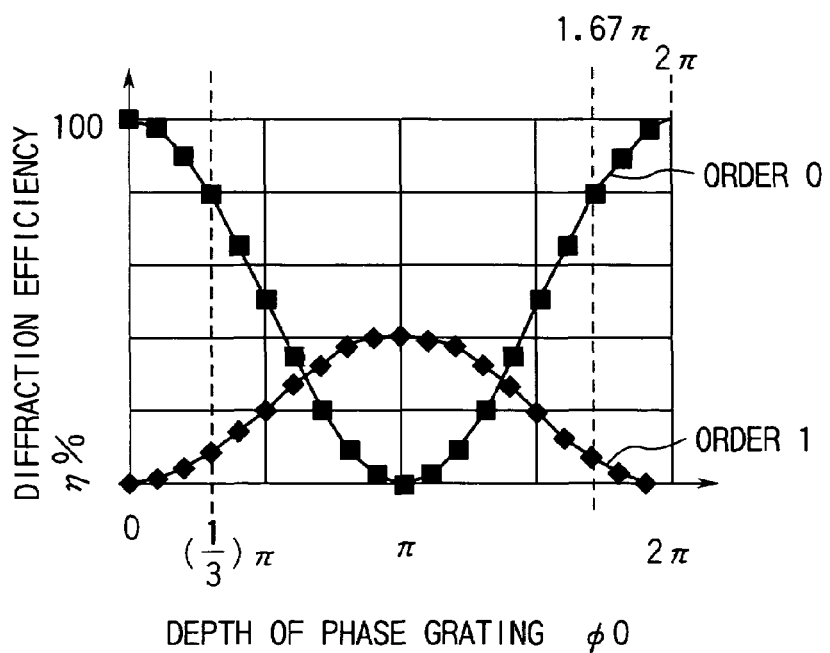
FIG. 3A is a characteristic diagram of phase grating depth and diffraction efficiency to help explain the principle of the present invention.
Figure 3B:
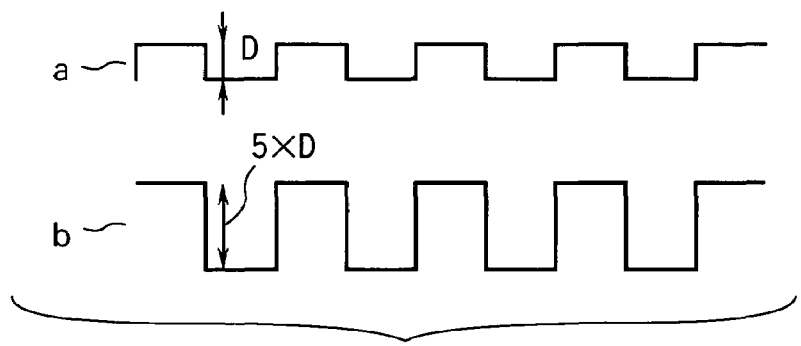
FIG. 3B shows the depth of the grating to help explain the principle of the present invention.

FIG. 3A shows a characteristic of the depth of the phase grating of the diffraction grating 12, the 0-order diffraction efficiency, and the first-order diffraction efficiency. The ordinate axis indicates diffraction efficiency and the abscissa axis indicates the depth of phase grating. In a conventional diffraction grating, the depth of phase grating to the wavelength of the second light source for CD is about $(⅓)\pi$ (a in FIG. 3B). In such a case, because the first-order diffraction efficiency also has an effect on the light beam from the first light source for DVD, unnecessary side beams appear.

The diffraction grating 12 of the present invention, however, is designed to satisfy the following equation:

$$h0 = \lambda 1/(n-1)$$

where $\lambda 1$ is the wavelength of the first light source for DVD, n is the refractive index, and h0 is the depth of the grating groove.

The phase grating depth $\phi 0$ of the diffraction grating is calculated using the following equation:

$$\phi 0 = 2\pi \cdot h0 \cdot (n-1)/\lambda;$$

The relationship between the phase grating depth $\phi 0$ and the diffraction efficiency $\eta$ is as shown in FIG. 3A. Since the wavelength of the light beam from the first light source for DVD is $\lambda 1$, the following equations are fulfilled:

$$0 = 2\pi \cdot h0 \cdot (n-1)/\lambda 1 = 2\pi$$

It follows that the 0-order diffraction efficiency $\zeta 0 = 100\%$ and the first-order diffraction efficiency $\zeta 1 = 0\%$. When the first-order diffraction efficiency is 0, this means that no sub-beam (diffraction light) occurs. The groove of the phase grating of the diffraction grating 12 that realizes no sub-beam is about five times as deep as that shown by a in FIG. 3B.

With the present invention, when the light source requiring no sub-beam (the DVD light source) is used in the optical path of the optical pickup, a diffraction grating whose grating groove has a depth of $m/(n-1)$ of the wavelength of the light source (where m is a natural number and n is the refractive index of the diffraction grating) is used. This prevents side beams from occurring in the DVD mode, increasing the main-beam receiving efficiency, which contributes to an improvement in the C/N of the signal without raising the amount of emission of the light source.

When the second light source (CD light source) is used, it goes as follows. The diffused light emitted from the light source 1b enters the diffraction grating 12. Since the wavelength of the second light source is $\lambda 2$, the phase grating depth $\phi 0$ of the diffraction grating 12 is:

$$\phi 0 = 2\pi \cdot \lambda 1/\lambda 2$$

Since $\lambda 2 = 780$ nm and $\lambda 1 = 650$ nm, this gives $0 = 1.67\pi$. At this time, from the characteristic of FIG. 3A, it follows that the 0-order diffraction efficiency $\eta 0 =$ about 75% and the first-order diffraction efficiency $\theta 1 =$ about 10%. Then, the main beam of order 0 and $\pm$ first-order side beams occur. This enables the diffraction grating 12 to sense the tracking error signal by a so-called three-beam method.

As explained above, with the optical head device of the present invention, when the light source 1b for CD is used, side beams necessary to sense a tracking error signal can be generated. When the light source 1a for DVD is used, side beams are prevented from occurring, which suppresses the loss of the light emitted from the light source 1a. This assures a suitable relationship between the amount of emission from the light source 1a and the quality of the playback signal, which improves the quality and reliability of the optical pickup device.

The present invention is not limited to the above embodiment.

When the optical head device is used in a system which senses a tracking error signal by a differential push-pull method, as in a DVD-RAM, it may be constructed as follows.

The grating groove depth h0 of the diffraction grating is set to h0=λ2/(n−1) so that side beams may occur only when the light source for DVD is used. Then, the side beams at that time are used in the differential push-pull method of sensing a tracking error signal.

Furthermore, two diffraction gratings one of which has a grating groove depth of h0=11/(n−1) and the other of which has a grating groove depth of h1=µ2/(n−1) may be so constructed that a differential push-pull method of sensing a tracking error sense signal is realized when the light source of DVD is used and that a tracking error signal can be sensed by a three-beam method when the light source for CD is used.

Various embodiments of the invention can be achieved using the structure of the diffraction grating that has two or more grating depths.

Figure 4A:
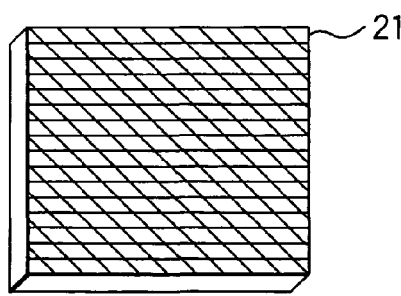
FIGS. 4A and 4B are diagrams to help explain a diffraction grating according to another embodiment of the present invention.

As shown in FIG. 4A, two types of uneven gratings differing in the direction of groove are provided on one side of the diffraction grating 21. The characteristic of one diffraction grating is so designed as explained in the first embodiment that, when the light source for DVD is used, the first-order diffraction efficiency is 0 and that, when the light source for CD is used, the first-order diffraction efficiency is 10% and the 0-order diffraction efficiency is 75%. The characteristic of the other diffraction grating is designed to realize a differential push-pull method of sensing a tracking error sense signal in DVD-RAM recording.

Figure 4B:
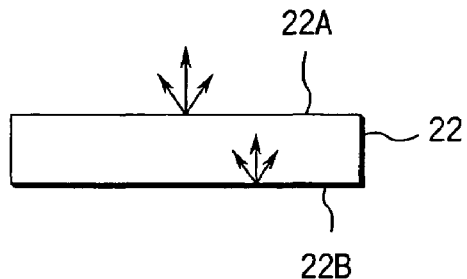

While in the above embodiment, the gratings are formed on one side of the diffraction grating 21, the diffraction grating characteristic on one side may differ from that on the other side as shown in FIG. 4B. For example, the side 22A may be so designed that, when the light source for DVD is used, the first-order diffraction efficiency is 0 and that, when the light source for CD is used, the first-order diffraction efficiency is 10% and the 0-order diffraction efficiency is 75%. Moreover, the other side 22B may be designed to realize a differential push-pull method of sensing a tracking error sense signal in DVD-RAM recording.

Since the relationship between the phase grating depth φ0 and the diffraction efficiency 77 varies at periodic intervals of a phase of 2π, the diffraction efficiency of the side beam can be set at a desired value by setting the grating groove depth h0 at m (m is a natural number) times h0=λ1/(n−1) or h1=λ2/(n−1).

The semiconductor laser device may be separate semiconductor lasers located close to each other, instead of the multi-wavelength semiconductor laser array.

Next, the pit structure of a disk from which the optical head device of the present invention reads the data will be explained.

Figure 5A:
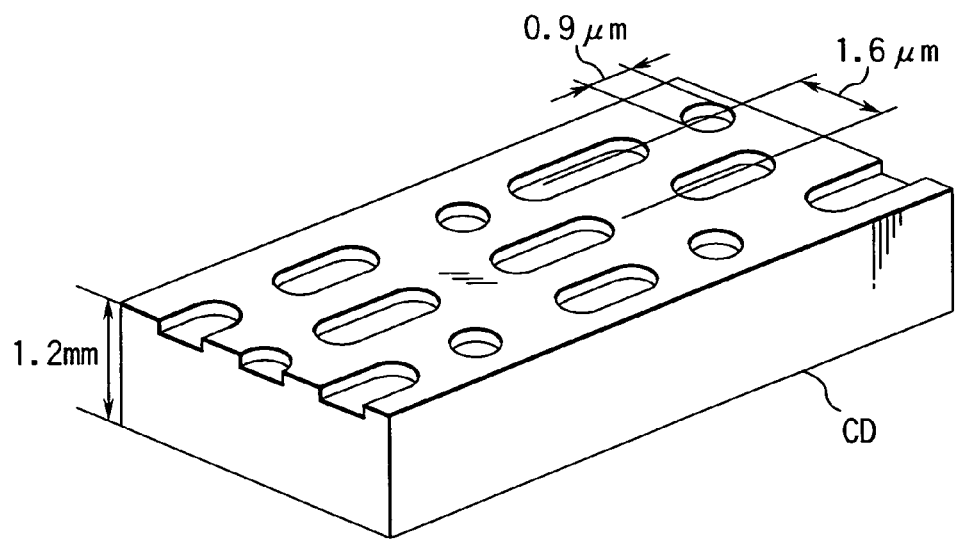
FIG. 5A shows the recording surface of a CD.
Figure 5B:
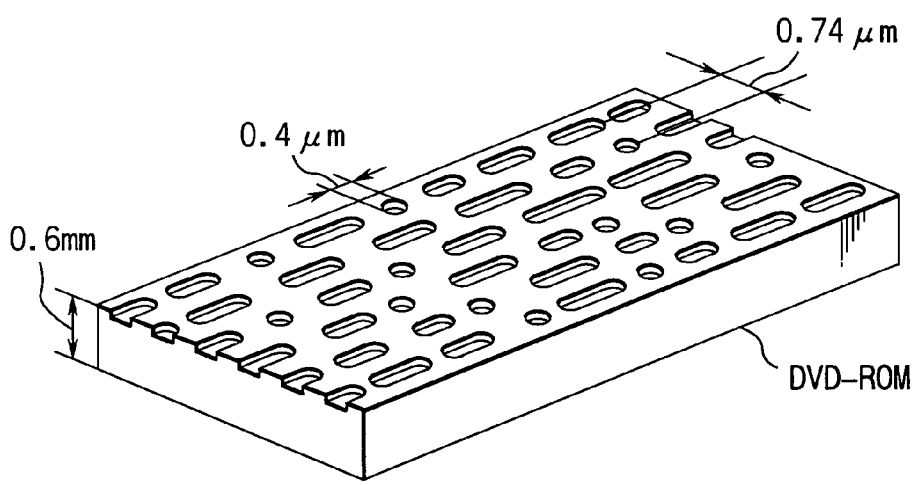
FIG. 5B shows the recording surface of a DVD-ROM.
Figure 5C:
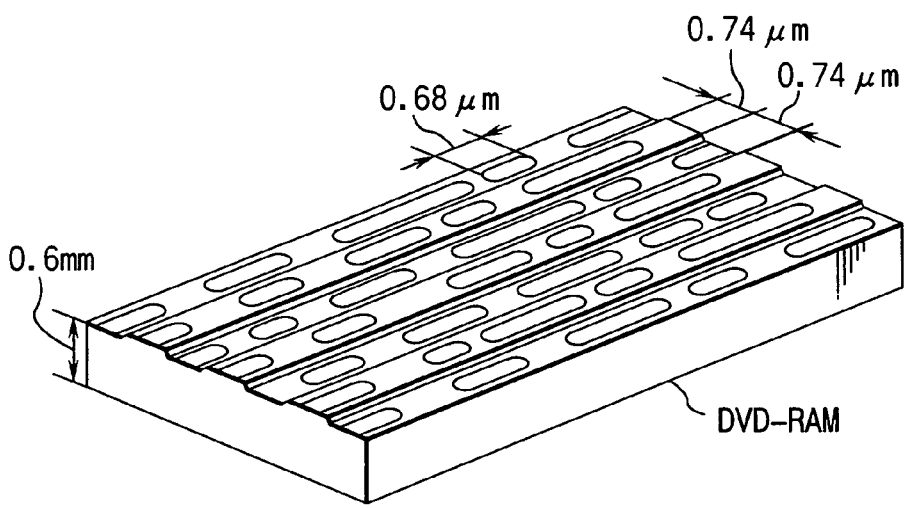
FIG. 5C shows the recording surface of a DVD-RAM.

FIG. 5A shows the structure of the recording surface of a CD, FIG. 5B shows the structure of the recording surface of a DVD-ROM, and FIG. 5C shows the structure of the recording surface of a DVD-RAM. An optical disk where the track pitch differs greatly from the shortest pit length requires a light source that provides light beams of the aforementioned different wavelengths.

Figure 6:
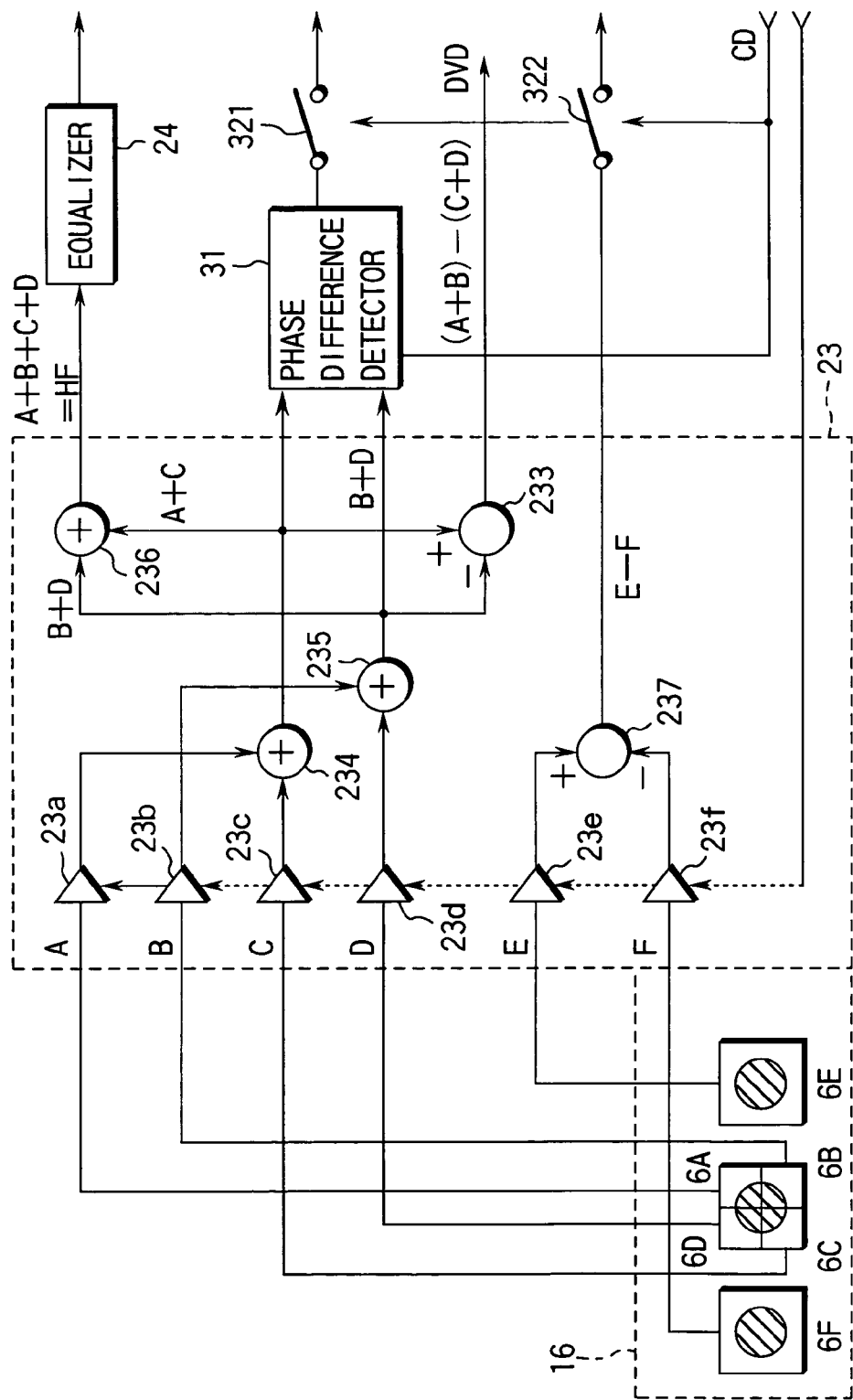
FIG. 6 shows an example of the electric signal processing route in an optical head device according to the present invention.

FIG. 6 shows an example of the electric signal processing route for processing the signal read by the optical head device. The photodetector 16 includes the photodiodes 6A, 6B, 6C, 6D, 6E, and 6F as explained in FIG. 2A. The outputs of the photodiodes 6A, 6B, 6C, 6D, 6E, and 6F are supplied to buffer amplifiers 23a, 23b, 23c, 23d, 23e, and 23f, respectively. The signals A to F outputted from the buffer amplifiers 23a, 23b, 23c, 23d, 23e, and 23f are calculated as described below.

An adder 231 produces signal (A+C) and an adder 232 produces signal (B+D). Using signal (A+C) from the adder 231 and signal (B+D) from the adder 232, an adder 233 produces (A+C)−(B+D). The signal (A+C)−(B+D) is used as a focus error signal.

An adder 234 produces signal (A+C) and an adder 235 produces signal (B+D). The signals (A+C) and (B+D) are inputted to a phase difference sensor 31. The output of the phase difference sensor 31 is used as a DVD tracking error signal. When a switch 322 is turned off, signal (E−F) obtained on the basis of the sub-beam sense signal is ignored.

The signals (A+B) and (C+D) are also inputted to an adder 236. The adder 235 produces signal (A+B+C+D) (hereinafter, referred to as signal HF).

Signal E and signal F are inputted to an adder 237. The adder 237 produces signal (E−F). The signal (E−F) is used as a CD tracking error signal. When the device is in the CD playback mode, the switch 322 is turned on. The above circuit configuration is available in various embodiments of the invention and is not restricted to the above configuration.

The present invention is not limited to the above embodiment.

According to the present invention, there is provided an optical head device with an optical layout assuring a good reproduction performance for a first disk (e.g., DVD) and a second disk (e.g., CD). The optical head device uses an nonpolarization blaze hologram as an element for directing the reflected light to the photodetector. Because this configuration achieves about 1.5 times the light use efficiency of an ordinary hologram when a nonpolarization rectangular hologram is used, the DVD playback performance is improved. Use of an nonpolarization hologram prevents CD birefringence from varying the amount of light received, producing a stable playback signal.

As a bad example of an optical head device, it is assumed that a (¼)λ plate is provided between the hologram and the objective and the linearly polarized light (P polarized light) is turned into a circularly polarized light in the transmit light system and the circularly polarized light is turned into a linearly polarized light (S polarized light) in the reflected light. This is because the S polarized light reflected from the optical disk is polarized into the first-order diffraction light at the hologram and the polarized light is directed to the photodetector. The hologram has a high efficiency of the 0-order diffraction light with respect to P polarized light and a high efficiency of the first-order diffraction light with respect to S polarized light.

It is desirable that the hologram should have a high light use efficiency. When such a polarizing element system (including the (¼) plate and polarization hologram) is used, the amount of light received by the photodetector varies due to the birefringence of the disk. This causes a problem: when the amount of birefringence of the disk is greater than the value in the specification, the playback signal fluctuates significantly. In the case of DVD, since its standard is severe, products with the amount of birefringence greater than that in the specification are not put on the market. In contrast, since CD products with the amount of birefringence greater than that in the specification have been on the market, a pickup device using the polarizing element system undergoes fluctuations in the amount of light received and has a great effect on the playback performance. When an optical pickup using a multi-wavelength semiconductor array is used as described above, a hologram is shared by DVD and a CD. Thus, use of a polarization hologram causes a problem: the playback signal fluctuates significantly due to the birefringence at the CD surface.

Figure 7A:
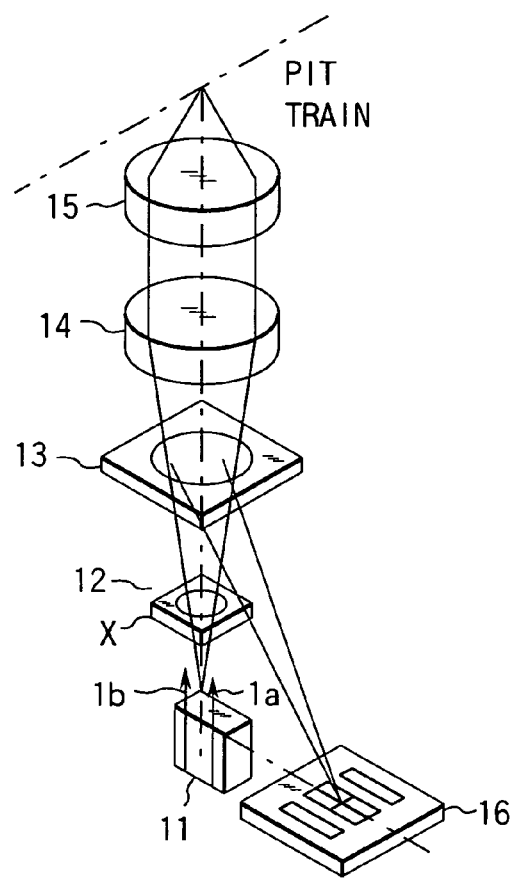
FIG. 7A is an explanatory diagram of a device using an nonpolarization hologram, showing another embodiment of the present invention.
Figure 7B:
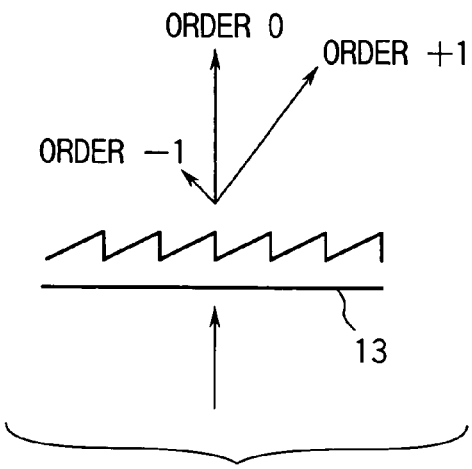
FIGS. 7B and 7C show examples of an nonpolarization hologram used in the device of FIG. 7A.
Figure 7C:
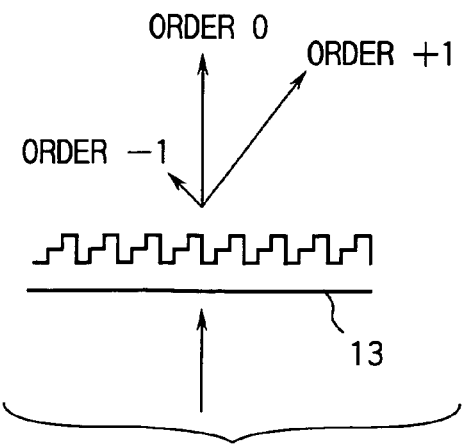

To overcome this problem, a nonpolarization hologram 13 as shown in FIG. 7B or 7C in the configuration as shown in FIG. 7A is used. In FIG. 7A, the same parts as those in FIG. 1 are indicated by the same reference symbols.

In the invention, a hologram whose grating is of a blaze shape is used. The grating of the hologram may be of an asymmetrical shape as shown in FIG. 7B or take the form of asymmetrical steps as shown in FIG. 7C.

In the semiconductor laser device 11, the first light source 1a outputs a DVD beam with a wavelength of 650 mm and the second light source 1b outputs a CD beam with a wavelength of 780 mm. The hologram 13 is a blaze hologram where the 0-order diffraction efficiency is almost the same as the + first-order diffraction efficiency and the − first-order diffraction efficiency is lower than the 0-order or + first-order diffraction efficiency. The hologram 13 is a nonpolarization hologram, where the diffraction efficiency does not vary according to the direction of polarization of incident light (P or S polarized light).

In DVD playback, the light emitted from the first light source 1a enters the hologram 13. The 0-order light emitted from the hologram 13 is converted by the collimator lens 14 into collimated light, which then enters the objective lens 15. The objective lens 15 projects the collimated light in such a manner that the light converges on the recording surface of the optical recording medium. The reflected light from the optical recording medium passes through the objective lens 15 and collimator lens 14 and enters the hologram 13. The + first-order light emitted from the hologram 13 is directed to the photodetector 16. In the photodetector 16, the light is converted by the photoelectric conversion element into an electronic signal.

In CD playback, the second light source 1b is used. The light emitted from the light source 1b passes through the same route as described above and is directed to the photodetector 16. In the photodetector 16, the reflected light from the optical disk is converted by the photoelectric conversion element into an electronic signal.

Figure 7D:
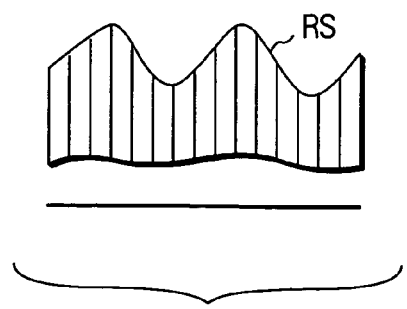
FIG. 7D is an explanatory diagram showing fluctuations in a playback signal.

With the above configuration, the light use efficiency is improved, stepping up the DVD playback performance. Use of the nonpolarization hologram prevents the amount of light received from fluctuating greatly due to birefringence, providing a stable playback signal. Although an optical system using the aforementioned polarizing element system (including a (¼)λ plate and a polarization hologram) permits the amount of light received to fluctuate due to the birefringence of a CD and therefore the playback signal RS varies significantly as shown in FIG. 7D, the optical head device of the present invention does not have such a problem.

The present invention is not limited to the above embodiments.

According to the present invention, there is provided an optical head device where the difference between the best tilt angle of DVD and that of CD is small and the playback signal performance is good in an optical head using a semiconductor laser array. To achieve this, the optical axis of the second light source for CD is aligned close with the optical axis of the objective. With this arrangement, the DVD light beam enters the objective obliquely, whereas the CD light beam does not enter the objective obliquely. In a DVD/CD interchangeable objective, the aberration caused by the oblique incidence of DVD is astigmatism, thus decreasing the best tilt angle and the deterioration of the playback signal performance, which makes the difference between the best tilt angle of DVD and that of CD smaller and provides a good playback signal performance.

Figure 8A:
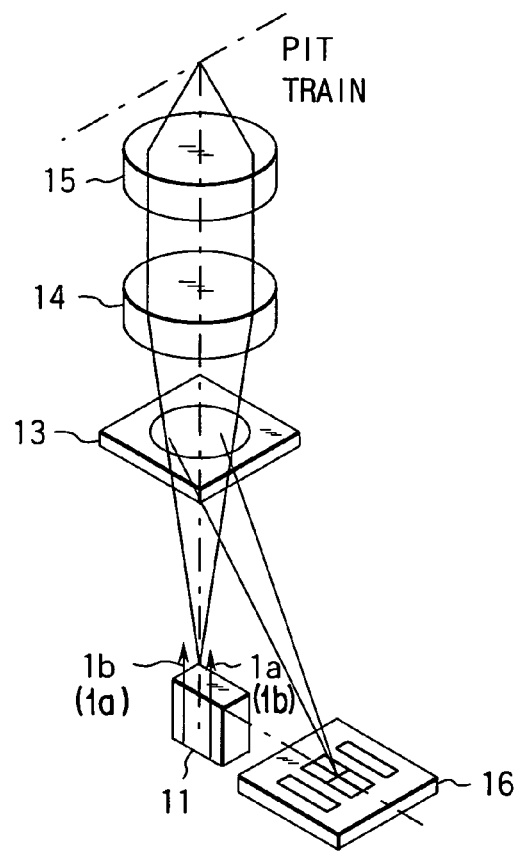
FIG. 8A is an explanatory diagram of a device where the optical axis of the objective lens placed asymmetrically with the optical axis of the first light source and that of the second light source, showing still another embodiment of the present invention.
Figures 8B, 8C:
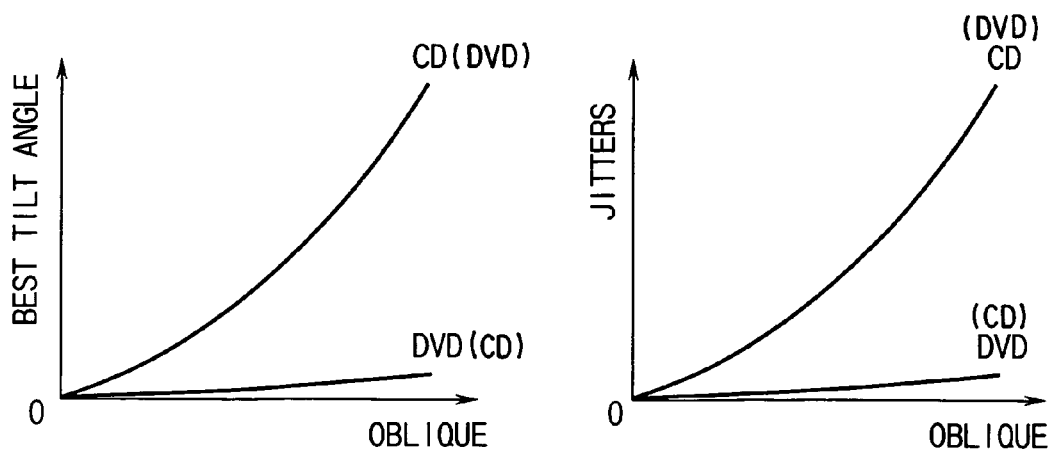
FIG. 8B shows the relationship between oblique incidence and the best tilt angle.
FIG. 8C shows the relationship between oblique incidence and jitters in the playback signal.

FIGS. 8A–8C shows the embodiment of the invention.

As shown in FIG. 8A, the optical axis of the second light source 1b for CD is caused to almost coincide with the optical axis of the objective lens 15.

In DVD playback, the diffuse light emitted from the first light source 1a enters the hologram 13. The light emitted from the hologram 13 is converted by the collimator lens 14 into collimated light, which then enters the objective lens 15. The objective lens 15 projects the collimated light in such a manner that the light converges on the recording surface of the optical recording medium. The reflected light from the optical recording medium passes through the objective lens 15 and collimator lens 14 and enters the hologram 13. The + first-order light diffracted by and emitted from the hologram 13 is directed to the photodetector 16. In the photodetector 16, the light is converted by the photoelectric conversion element into an electronic signal.

In CD playback, the second light source 1b is used. The light emitted from the light source 1b passes through the same route as described above and is directed to the photodetector 16. In the photodetector 16, the reflected light from the optical disk is converted by the photoelectric conversion element into an electronic signal.

The objective lens 15 can be driven by a servo system in the focusing direction and the tracking direction in such a manner that an objective driving unit can cause the objective to follow the surface jolt or the decentering of the disk.

FIG. 8B shows the relationship between an angle of the oblique incidence of the light beam striking the objective lens 15 and best tilt angle. FIG. 8C shows the relationship between the angle of the oblique incidence of and jitters in the light beam striking the objective lens 15. The "best tilt angle" is the angle at which the disk is inclined to the base plane of the optical apparatus. While the disk is inclined at this angle, best possible signals can be reproduced from the disk. The DVD/CD interchangeable objective lens 15 is designed to give priority to DVD. The priority to DVD means that parameters or factors, curvature and focal distance, etc, on the design are selected to desirable to DVD playback. In DVD playback, the objective lens 15 causes astigmatism for oblique incidence. On the other hand, when the objective lens 15 is used in playing back a CD, it causes coma because oblique incidence collapses the sine condition. Thus, in CD playback, the best tilt angle and jitter characteristic deteriorate, but the degree of deterioration is low in DVD.

Taking into account the above characteristics, the first light source and second light source are placed asymmetrically with the optical axis of the objective lens 15 as shown in FIG. 8A. Then, the optical axis of the objective lens 15 is caused to coincide with the optical axis of the CD light source.

With this arrangement, when the light source 1b for CD is used, there is no oblique incidence on the objective lens 15, which helps prevent the best tilt angle and jitter characteristic from deteriorating. When the DVD light source 1a is used, there is oblique incidence on the objective lens 15. However, because the aberration caused by oblique incidence dominate astigmatism, the deterioration of the best tilt angle and jitter characteristic lies in the permitted range.

As described above, the device of the invention comprises the first and second light sources and the objective lens 15. The first light source and second light source are arranged asymmetrically with the optical axis of the objective lens 15.

If the thickness of the substrate of a first optical disk is t1, the thickness of the substrate of a second optical disk is t2, the distance between the axis of the first light source and the optical axis of the objective lens is δ1, and the distance between the axis of the second light source and the optical axis of the objective lens is δ2, it is desirable that the following expressions should be satisfied: t1<t2 and δ1>δ2. The optical axis of the second light source is caused to almost coincide with the optical axis of the objective. The first and second light sources constitute a multi-wavelength semiconductor laser device.

In the embodiment(s) described above, the objective lens 15 is one designed to be fit in reproducing data signals from DVDS. Nonetheless, the objective lens 15 may be designed for use in reproducing data signals from CDs. In this case, the characteristic curves of the (DVD) and the characteristic curve of the (CD) shown in FIGS. 8B and 8C are interchanged. Thus, it is desired that the optical axis of the objective lens 15 be aligned with the optical axis of the light source (1a) provided for the DVD.

In this case, the DVD/CD interchangeable objective lens 15 is designed to give priority to CD. The priority to CD means parameters or factors, curvature and focal distance, etc, on the design are selected to desirable to CD playback.

In CD playback, the objective lens 15 causes astigmation for oblique incidence. On the other hand, when the objective lens 15 is used in playing back a DVD, it causes coma because oblique incidence collapses the sine condition. Thus, in DVD playback, the best tilt angle and jitter characteristic deteriorate, but the degree of deterioration is low in CD.

Taking into account the above characteristics, the optical axis of the objective lens 15 is caused to approximately coincide with the optical axis of the DVD light source (1a).

With this arrangement, when the light source (1a) for DVD is used, there is no oblique incidence on the objective lens 15, which helps prevent the best tilt angle and jitter characteristic from deteriorating. When the CD light source (1b) is used, there is oblique incidence on the objective lens 15. However, because the aberration caused by oblique incidence dominate astigmatism, the deterioration of the best tilt angle and jitter characteristic lies in the permitted range.

Since the numeric aperture of CD is smaller than that of DVD, the aberration caused by oblique incidence in the DVD/CD interchangeable objective lens 15 designed priority to CD is less than that of the DVD/CD interchangeable designed priority to DVD. If the objective lens designed as priority to DVD, when the optical axis of the CD light source is inclined, the best tilt angle and jitter characteristic deteriorate. This is because of a generation of the aberration is in proportion to the cube of the numeric aperture.

In the above embodiment, if thickness of the substrate of a first optical disk is t1, the thickness of the substrate of a second optical disk is t2, the distance between the axis of the first light source and optical axis of the objective is δ1, and the distance between the axis of the second light source and the optical axis of the objective lens is δ2, it is desirable that the following expressions should be satisfied;

$$t1 > t2 \text{ and } \delta1 < \delta2$$

The present invention is not restricted to the above embodiment.

In the present invention, a good-quality focus error signal can be obtained in both of DVD playback and CD playback. Therefore, the invention is characterized in that the center of the hologram is placed halfway between the optical axis of the first light source and that of the second light source. This sets both the amplitude of the focus error signal in CD playback and that in DVD playback at a suitable level, which improve the quality of the focus error signal for the entire device.

FIGS. 9A, 9B, 9C, 10A and 10B are diagrams to help explain the embodiment.

As shown in FIG. 9A, it is assumed that the center of the hologram 13 is on the optical axis of the second light source 1b and coincides with the optical axis f the objective lens 15. In this situation, the area of the hologram through which the light beam passes is as follows. FIG. 9B shows a case where the second light source 1b (for CD) is used and the hologram pattern 3a is concentric with the playback beam 9a. In contrast, FIG. 9C shows a case where the first light source 1a (for DVD) is used, the hologram pattern 3a and playback beam 9b have shifted significantly in the direction in which the light sources are arranged.

Such a state causes the amplitude of the focus error signal to decrease significantly. To avoid this drawback, the optical axis 151 of the objective lens 15 is caused to align close with the optical axis of the second light source 1b. The center (=the origin of a phase transfer function) axis 131 of the hologram 13 is placed almost at the midpoint between the optical axis of the first light source 1a and that of the second light source 1b.

FIG. 10B shows an example of a beam pattern on the light-receiving elements of the photodetector 16. For example, the beam pattern is for a CD. In the beam pattern, the main beam is divided in two and each sub-beam is also divided in two. The operating principle is similar to that of the diffraction grating explained earlier.

Figure 11A:
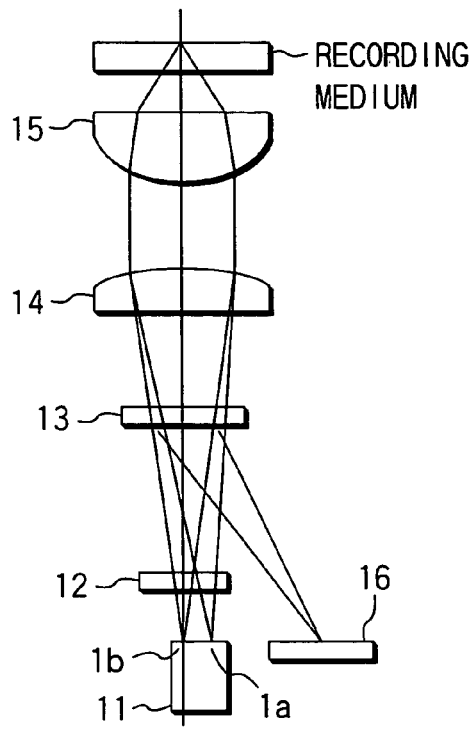
FIG. 11A is a side view of the device of FIG. 10A.
Figure 11B:
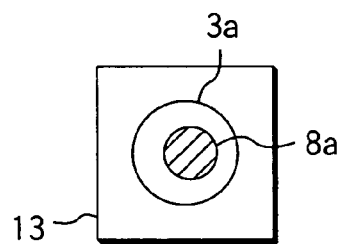
FIGS. 11B and 11C show beam spots projected on the hologram of the device of FIG. 11A.
Figure 11C:
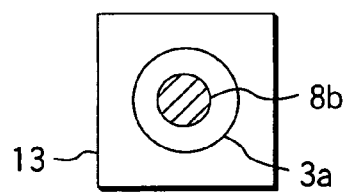
Figure 11D:
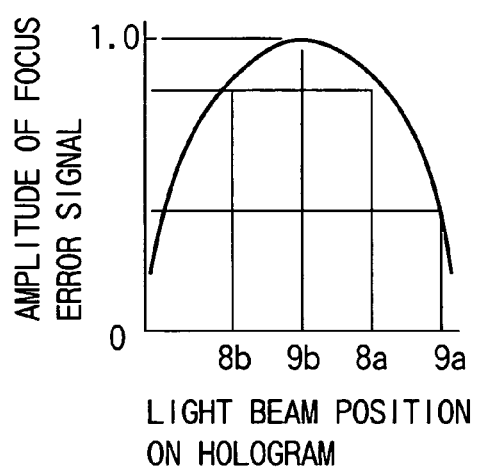
FIG. 11D shows the relationship between the position of light beam on the hologram and the focus error signal amplitude.

FIG. 11A is a side view of an optical head device having the hologram 13 placed as shown in FIG. 10A. In such an arrangement, the using area of the light beam 8a from the first light source 1a and that of the light beam 8b from the light source 1b are placed in such a manner that they are shifted from the center of the hologram pattern 3a in the opposite direction to each other. In FIG. 11D, the abscissa axis indicates the light beam position on the hologram and the ordinate axis indicates the focus error signal amplitude.

As seen from the relationship between the focus error amplitude and the light beam position on the hologram pattern of FIG. 11D, the arrangement of FIG. 11A provides a larger focus error amplitude even in that state. Namely, a larger amplitude of the focus error signal can be obtained in both DVD playback and CD playback. As seen from FIG. 11D, the location of the hologram in FIG. 9A produces only a smaller focus error signal in DVD playback.

With the above configuration, the amplitude of a suitable focus error signal can be obtained in both DVD playback and CD playback, improving the reliability of the pickup device.

On the other hand, the photodiodes 6a to 6d (FIG. 10B) of the photodetector 16 receive the light beams quadrisected by the hologram pattern 3a and detect the phase difference between the respective amounts of light received, thereby obtaining a DVD tracking error signal. Therefore, it is desirable that the light beam 8a in DVD playback should be closer to the center of the hologram pattern 3a. In contrast, the tracking error signal in CD playback is independent of the relative position between the hologram pattern 3a and the light beam 8b, because a three-beam method is used. Taking into account the tracking error signal, the CD mode has a more margin for the positional gap between the hologram pattern 3a and the light beam than the DVD mode.

Therefore, the amplitude of the tracking error signal can be obtained suitably by placing the center of the hologram 13 closer to the first light source 1a than the midpoint between the first light source 1a and second light source 1b with respect to the optical axis of the optical system.

The focus error signal is sensed in the lens action by a mixed aberration method (refer to U.S. Pat. No. 5,161,139).

The above device of the present invention comprises a first light source, a second light source, at least one objective lens, and a hologram. The first light source emits a light beam of a first wavelength which is projected onto a first optical disk. The second light source, which is placed at almost the same position as that of the first light source, emits a light beam of a second wavelength which differs from the first wavelength in the direction almost parallel with the light beam of the first wavelength and is projected onto a second optical disk differing in specifications from the first optical disk. The objective lens projects the light beams from the first and second light sources onto the recording and reproducing surfaces of the optical disk in such a manner that the beams converge on the surfaces and causes the reflected light from the recording and reproducing surfaces to pass through in the opposite direction to the direction in which the beams travel. The hologram detects the gap in focus between the recording and reproducing surfaces and the converging light beams projected by the objective.

The position at which the center of the hologram is projected on a plane including the first and second light sources in the direction of the axis of the objective is placed between the first and second light sources.

If the distance between the projected position and the first light source is $\delta 1$ and the distance between the projected position and the second light source is $\delta 2$, the following expression $\delta 1 = \delta 2$ may be satisfied. In addition, the hologram detects a shift in focus by a mixed aberration method.

Furthermore, a device of the present invention comprises a first light source, a second light source, a diffraction grating, an objective, and a hologram. The first light source emits a light beam of a first wavelength which is projected onto a first optical disk. The second light source, which is placed at almost the same position as that of the first light source, emits a light beam of a second wavelength which differs from the first wavelength in the direction almost parallel with the light beam of the first wavelength and is projected onto a second optical disk differing in specifications from the first optical disk. The diffraction grating generates side beams for detecting a slip in tracking on the second optical disk.

If the distance between the projected position at which the center of the hologram is projected on a plane including the first and second light sources in the direction of the optical axis of the objective and the first light source is $\delta 1$, and the distance between the projected position and the second light source is $\delta 2$, the following expression $\delta 1 < \delta 2$ is satisfied.

The present invention is not limited to the above embodiments. Hereinafter, still another embodiment of the present invention will be explained.

Since in an optical pickup using a multi-wavelength semiconductor array, the DVD light source is separated from the CD light source, the position on the hologram at which the light source is projected in the direction of optical axis disagrees with the center of the hologram. This causes the problem of degrading the quality of the focus error signal. To overcome this problem, it is desirable that the hologram should be placed as far away from the semiconductor laser array as possible.

On the other hand, because the hologram is used in both DVD and CD, it is desirable that the level of the playback signal should not vary due to the birefringence of the disk. To achieve this, use of a nonpolarization hologram can be considered. When a nonpolarization hologram is used, the 0-order light from the hologram is projected via the objective lens onto the disk in the transmit light system and the + first-order light from the hologram is directed to the photodetector in the reflection system. The − first-order light in the transmit light system arrives at the photodetector as the 0-order light in the reflection system, causing stray light. The stray light contributes to the deterioration of the quality of the playback signal. To reduce such stray light, it is desirable that the hologram should be placed close to the semiconductor laser array and the diffraction angle be made larger to cause an aperture to cut off the first-order light in the transmit light system.

As described above, to achieve a good-quality focus error signal, the distance between the semiconductor laser array and the hologram should be as large as possible. To reduce stray light, the distance between the semiconductor laser array and the hologram should be as close as possible. These two requirements disagree with each other.

To overcome this problem, the present invention makes it possible to set the optimum distance between the semiconductor laser array and the hologram.

Figure 12A:
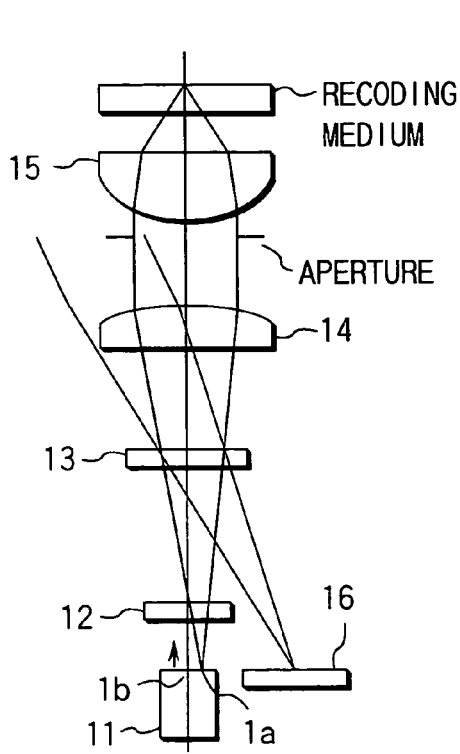
FIG. 12A is an explanatory diagram of a device where the relationship between the distance between the semiconductor laser light source and the hologram and the distance between the first and second light sources of the semiconductor laser device has been improved, showing still another embodiment of the present invention.

FIG. 12A shows the configuration of an optical head device. In DVD playback, the light emitted from the first light source 1a enters the hologram 13. The light emitted from the hologram 13 is converted by the collimator lens 14 into collimated light. The collimated light emitted from the collimator lens 14 is limited by an aperture to a suitable numerical aperture. The resulting light enters the objective lens 15. The objective lens 15 projects the light in such a manner that the light converges on the recording surface of the recording medium. The reflected light from the recording medium passes through the objective lens 15, aperture, and collimator lens 14 and enters the hologram 13. The hologram 13 emits the + first-order light, which is then directed to the photodetector 16. The photodetector 16 converts the light into an electronic signal.

In CD playback, the second light source 1b is used. The light emitted from the light source 1b passes through the same route as described above. The reflected light from the recording medium is directed to the photodetector 16.

As described above, with the optical head device, the single hologram 13 is shared by the first light source and second light source. Since the diffraction angle at the hologram 13 is almost proportional to the wavelength, the first light source 1a for DVD of a shorter wavelength is placed on the photodetector 16 side and the second light source 1b for CD is placed farther away from the photodetector 16 than the first light source 1a. This arrangement enables the single photodetector 16 to receive the light from both the first and second light sources.

Since the diffraction angle is almost proportional to the wavelength, the distance from the first light source 1a to the second light source 1b is also proportional to the distance from the first light source 1a to the photodetector 16.

Figure 12B:
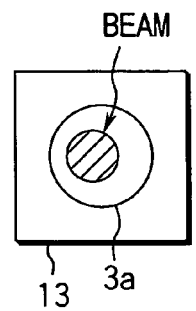
FIG. 12B is an explanatory diagram of a beam spot projected on the hologram.

As shown in FIG. 12A, in a multi-wavelength semiconductor laser, because the first light source is separated from the second light source, it is impossible to cause the positions at which the first light source and second light source are projected on the hologram in the direction of optical axis to coincide with the center of the hologram 13 at the same time. Consequently, the beam deviates from the center of the hologram pattern of the hologram 13 as shown in FIG. 12B.

Figure 12C:
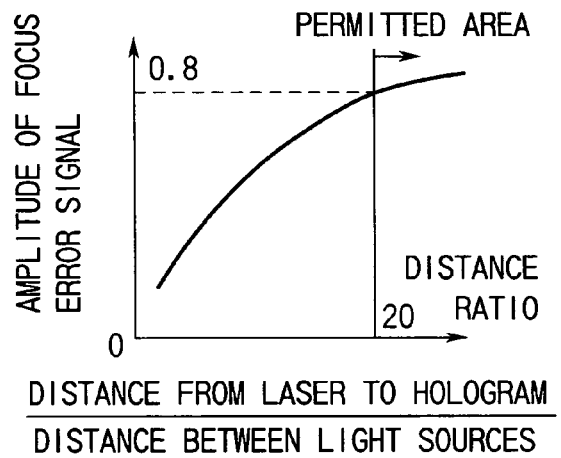
FIG. 12C shows the relationship between the focus error signal amplitude and the ratio of the distance from the laser light source to the hologram to the distance between the light sources.

In FIG. 12C, the abscissa axis indicates the ratio of the distance from the semiconductor laser light source to the hologram 13 to the distance between the two light sources, and the ordinate axis indicates the amplitude of the focus error signal. As the distance from the semiconductor laser light source to the hologram 13 becomes larger, the beam on the hologram 13 becomes larger, which makes the effect of a shift in the light source relatively small and increases the amplitude of the focus error signal.

If the amplitude of the focus error signal with no shift in the light source is 1, the allowed value of a drop in the amplitude is 0.8. Thus, it is desirable that the ratio of the distance from the semiconductor laser light source to the hologram 13 to the distance between the two light sources should be 20 or more.

On the other hand, as shown in FIG. 12A, part of the −first-order light from the hologram in the transmit light system might not be limited by the aperture and enter the objective lens 15. The light enters the photodetector 16 as the 0-order light from the hologram 13 in the receive light system, resulting in stray light.

Figure 12D:
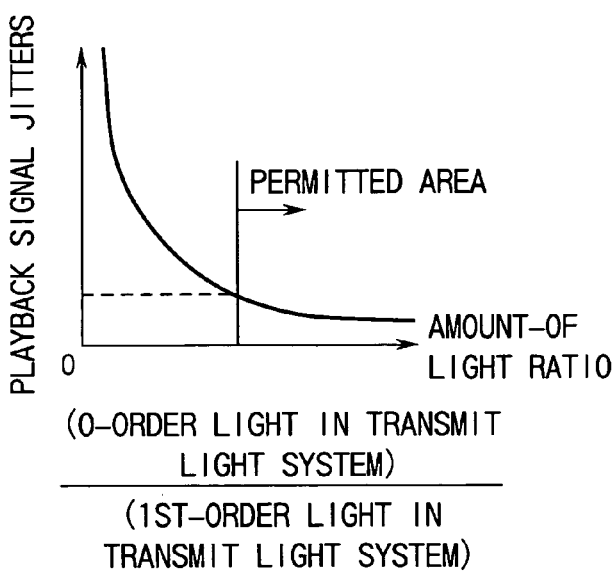
FIG. 12D shows the relationship between the light amount ratio and playback signal jitters.

In FIG. 12D, the abscissa axis indicates the ratio of the amount of the 0-order light to the amount of the − first-order light in the transmit light system, and the ordinate axis indicates playback signal jitters. As the amount-of-light ratio is higher, the signal-to-noise ratio is improved more, reducing playback signal jitters.

Figure 12E:
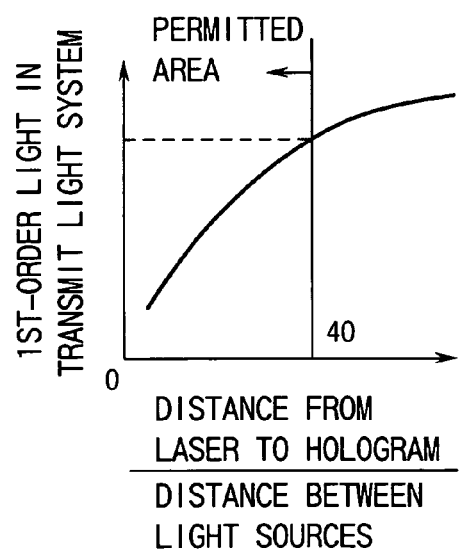
FIG. 12E shows the relationship between the – first-order light in the transmit light system and the ratio of the distance from the laser light source to the hologram to the distance between the light sources.

In FIG. 12E, the abscissa axis indicates the ratio of the distance from the semiconductor laser light source to the hologram 13 to the distance between the two light sources, and the ordinate axis indicates the − first-order light in the transmit light system. From the permitted range of the − first-order light in the transmit light system, it is desirable that the ratio of the distance from the semiconductor laser light source to the hologram 13 to the distance between the two light sources should be 40 or less.

It will be understood from what has been described above that an optical head which produces a good-quality focus error signal and provides a good playback performance of playback signals by setting the ratio of the distance from the semiconductor laser light source to the hologram 13 to the distance between the two light sources at 20 or more and 40 or less.

According to the present invention, there is also provided a manufacturing method by which the aforementioned optical head is assembled with high accuracy.

Figure 13A:
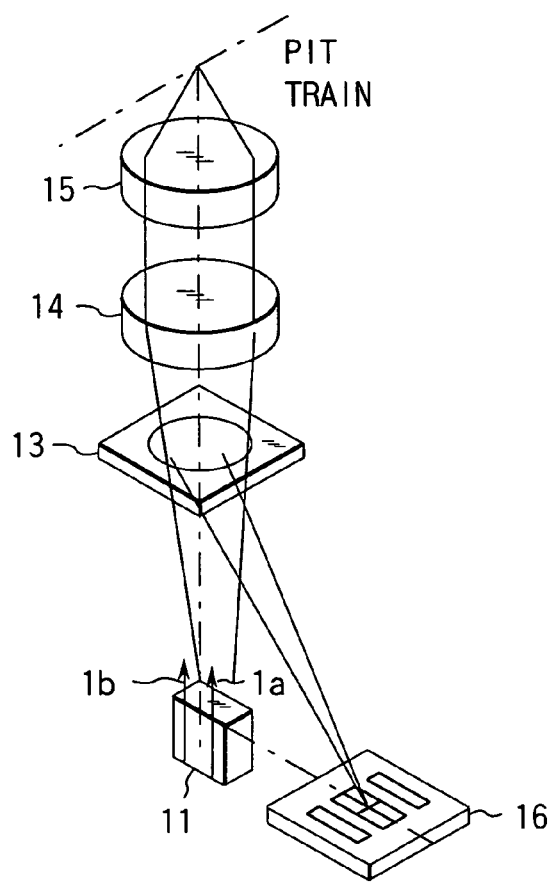
FIG. 13A is a diagram to help explain a method of assembling a device related to the present invention.

It is assumed that an optical head device is assembled with the individual component parts located as shown in FIG. 13A. It should be noted that the semiconductor laser device 11 is a multi-wavelength semiconductor laser device. For example, a light source 1b for CD (which outputs a beam with a wavelength of 780 nm) and a light source 1b for DVD (which outputs a beam with a wavelength of 650 nm) are so provided that they are very close to each other. The hologram 13 is so constructed that it is formed integrally with the semiconductor laser device 11 and photodetector 16 with an accuracy of about 10 µm.

Figure 13B:
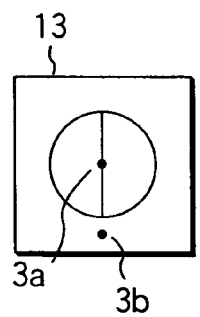
FIG. 13B shows an example of a marker attached to the hologram.

To make it easier to assemble the device, markers 3a and 3b are attached to the hologram 13 in the present invention as shown in FIG. 13B. The marker 3a is placed at the position at which the second light source 1b is projected in the direction of optical axis and the marker 3b is placed at the position at which the photodetector 16 is projected in the direction of optical axis.

When the position of the hologram 13 is adjusted during assembly, the laser device side is viewed from the collimator 14 side by means of, for example, a microscope and the marker position is adjusted so that the markers 3a and 3b may coincide with a specific optical axis.

Figure 13C:
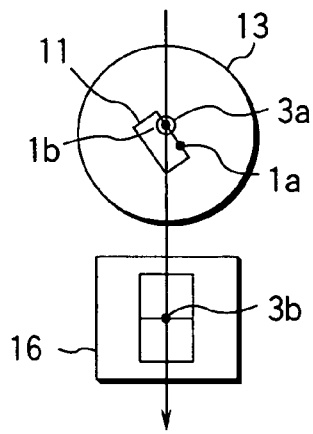
FIG. 13C is a diagram to help explain the work of aligning the positions of component parts.

FIG. 13C shows an example of a state where the second light source 1b is fitted on the marker 3a provided at the center of the hologram pattern of the hologram 13 and the optical axis directed to 1=the photodetector 16 is fitted on the marker 3b.

Normally, the beam from the first light source 1b of the semiconductor laser device 11 coincides with the line connecting the markers 3a and 3b. In the example, the semiconductor laser device 11 is provided in such a manner that it is turned a little.

Figure 13D:
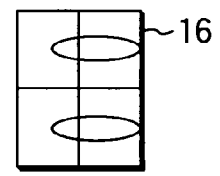
FIGS. 13D and 13E show examples of beam spots projected on the photodetector.
Figure 13E:
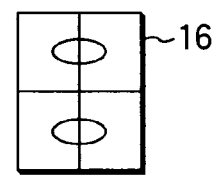

FIGS. 13D and 13E show examples of the beam spots formed on the quadrisected diodes of the photodetector 16, when the position is aligned in such a state.

Although FIG. 13D shows the beam spot of the main beam for DVD, the spot of the reflected light directed onto the photoelectric conversion element of the photodetector 16 deviates slightly from the desired position on the photoelectric conversion element, because the projected spot of the first light source 1a on the hologram deviates from the line connecting the markers 3a and 3b. Namely, the spot of the reflected light is asymmetrical on the dividing line. In the case of a DVD beam, however, because the aperture is large, the diameter of the beam spot is so large that the deviation of the spot from the desired position has almost no adverse effect on the playback function of the playback signal. Specifically, the effect of the deviation on the playback performance is less than the effect of a shift in the CD beam spot on the playback performance.

In contrast, FIG. 13E shows beam spots of the CD main beam. As shown in FIG. 13C, because the second light source 1b is so adjusted that the projected spot on the hologram coincides with the marker 3a, the spot of the reflected light directed to the photodetector 16 coincides with the desired position on the photoelectric conversion element.

Figure 14A:
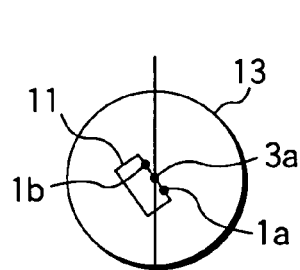
FIG. 14A is a diagram to help explain the work of aligning the positions of component parts in another method of assembling a device related to the present invention.
Figure 14A:
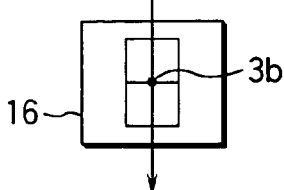
Figure 14B:
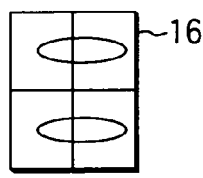
FIGS. 14B and 14C show examples of beam spots projected on the photodetector.
Figure 14C:
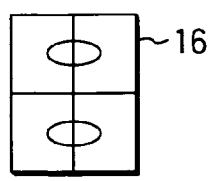

The present invention is not limited to the above embodiments and may be applied to a method as shown in FIGS. 14A–14C. Specifically, a first marker 3a is provided halfway between the projected positions of the first and second light sources 1a and 1b of the semiconductor laser device 11 and a marker 3b is provided at the position at which the midpoint of the quadrisected diodes of the photodetector 16 is projected in the direction of optical axis. The semiconductor laser device 11 and photodetector 16 are provided on a substrate (not shown). When the hologram 13 is mounted on the substrate, the semiconductor laser device 11 and photodetector 16 are viewed along the optical axis and the hologram is adjusted in such a manner that the marker 3a on the hologram 13 coincides with the center of the light source 1a and that of the light source 1b and the second marker 3a on the hologram 13 coincides with the center of the main beam detector (the center of the quadrisected diodes) of the photodetector 16. Then, the hologram is secured to the substrate. With this configuration, even when the semiconductor laser device 11 is provided a little away from the desired position (for example, rotated a little as shown in FIG. 14A), both the first light source 1a for DVD and the second light source 1b for CD are placed in such a manner that they deviate from the markers on the hologram 13. As a result, both the DVD beam spot and CD beam spot on the photodetector 16 are formed asymmetrically with the dividing line as shown in FIGS. 14B and 14C. In this embodiment, the playback performance will not deteriorate seriously in only either DVD playback or CD playback.

In the optical head device, if the numerical aperture when the light beam from the first light source is used is NA1 and the numerical aperture when the light beam from the second light source is used is NA2, the following expression NA1>NA2 is satisfied.

In the concept of the present invention, the technical ideas explained in FIGS. 1, 7A, 7B, 7C, and 7D may be combined for application. In addition, the technical idea explained in FIGS. 8A–8C may be selectively applied to or be combined with the technical ideas in FIGS. 1 and 7A.

The present invention includes both of the technical idea explained in FIG. 8A and that explained in FIG. 10A. A combination of the technical ideas in FIGS. 8A and 10A and that explained in FIG. 7A is also within the scope of the invention.

The technical idea explained in FIG. 12A may be combined with each of the above technical ideas.

As explained above, with the present invention, side beams are allowed to occur when a light source of a first wavelength is used, whereas side beams are prevented from occurring when a light source of a second wavelength is used. This improves the light use efficiency of the second light source.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical head device comprising:
   a first light source for emitting a light beam of a first wavelength;
   a second light source which emits a light beam of a second wavelength differing from said first wavelength;
   a single block wherein the first and second light sources are aligned thereon;
   an objective lens for causing the laser light from said first or second light source to converge on an optical disk; and
   a hologram for diffracting the light reflected from said optical disk and returned through said objective lens and directing the reflected light to a light-receiving element,
   wherein said hologram has a first marker attached to the projected position in the direction of the optical axis of said second light source, the first marker serving as a mark in installing said hologram.

2. An optical head device comprising:
   a first light source for emitting a light beam of a first wavelength;
   a second light source which emits a light beam of a second wavelength differing from said first wavelength;
   a single block wherein the first and second light sources are aligned thereon;
   an objective lens for causing the laser light from said first or second light source to converge on an optical disk; and
   a hologram for diffracting the light reflected from said optical disk and returned through said objective lens and directing the reflected light to a light-receiving element,
   wherein said hologram has a first marker attached to the position of the midpoint between the projected position in the direction of the optical axis of said first light source and the projected position in the direction of the optical axis of said second light source, the first marker serving as a mark in installing said hologram.

3. The optical head device according to any one of claims 1 and 2, wherein, if the numerical aperture when the light beam from said first light source is used is NA1 and the numerical aperture when the light beam from said second light source is used is NA2, the expression NA1>NA2 is satisfied.

4. The optical head device according to any one of claims 1 and 2, wherein said hologram has a second marker attached to the position corresponding to an optical axis extending to any point on said light-receiving element.

5. The optical head device according to claim 4, wherein said any point is the center of said light-receiving element.

6. The optical head device according to claim 4, wherein said any point is the marker provided on said light-receiving element.

7. The optical head device according to claim 1, further comprising:
   a diffraction grating having first and second surfaces provided between the hologram and the single block, wherein the first surface of the diffraction grating has a first-order diffraction efficiency of almost zero for the first light beam forward from the first light source and emits the first-order diffraction light for the second light beam forwarded from the second light source, and the second surface of the diffraction grating is designated to realize a differential push-pull method of sensing a tracking error sense signal, and wherein the first and second surfaces of the diffraction grating do not diffract retuned light from a recording medium.

8. The optical head device according to claim 7, wherein the depth h01 of the grating groove of said first surface of the diffraction grating is expressed by $$h01 = m1 \cdot \lambda 1/(n1-1) \text{ and}$$

the depth h02 of the grating groove of said second surface of the diffraction grating is expressed by $$h01 = m1 \cdot \lambda 1(n1-1)$$

where n1 is the refractive index of said first surface of the diffraction grating, n2 is the refractive index of said second surface of the diffraction grating, λ1 is the wavelength of said first light source, λ2 is the wavelength of said second light source, and m1 and m2 are natural numbers.

9. The optical head device according to claim 2, further comprising;
   a diffraction grating having first and second surfaces provided between the hologram and the single block, wherein the first surface of the diffraction grating has a first-order diffraction efficiency of almost zero for the first light beam forward from the first light source and emits the first-order diffraction light for the second light beam forwarded from the second light source, and the second surface of the diffraction grating is designated to realize a differential push-pull method of sensing a tracking error sense signal, and wherein the first and second surfaces of the diffraction grating do not diffract retuned light from a recording medium.

* * * * *